No. 777,970. PATENTED DEC. 20, 1904.
M. B. & H. S. MILLS.
MAIL BOX, &c.
APPLICATION FILED MAR. 3, 1903.
NO MODEL. 12 SHEETS—SHEET 1.
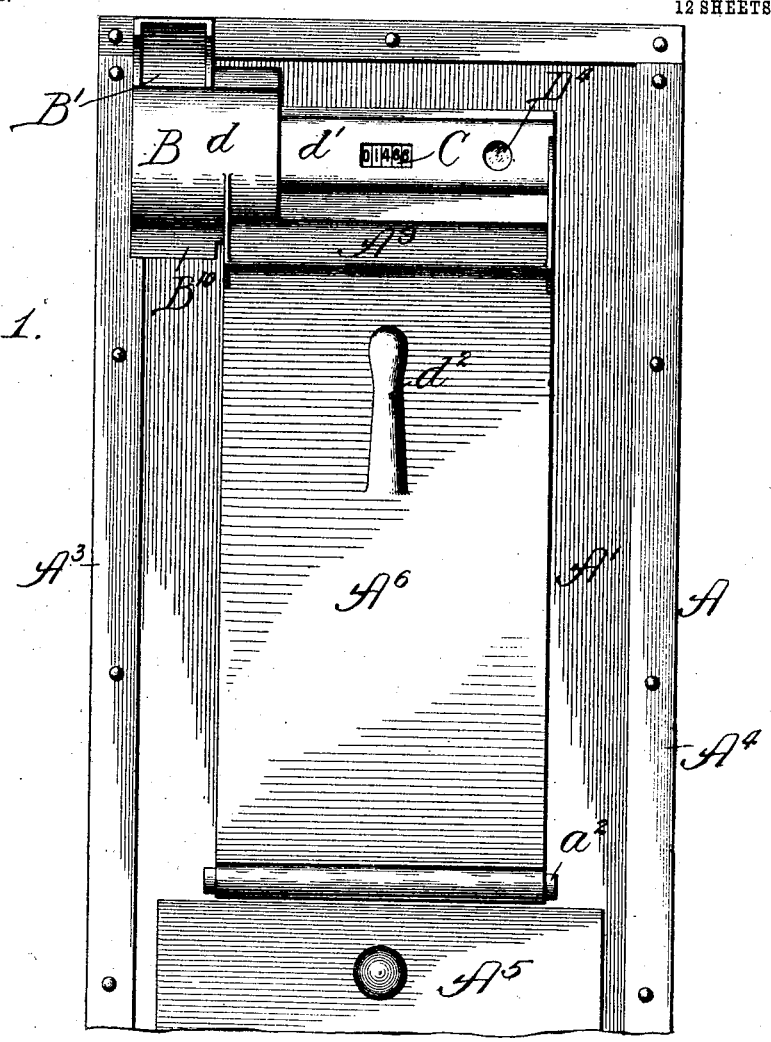
Fig. 1.
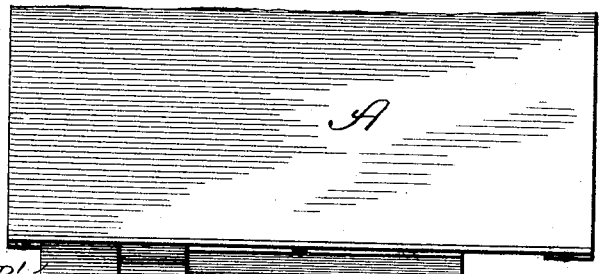
Fig. 2.
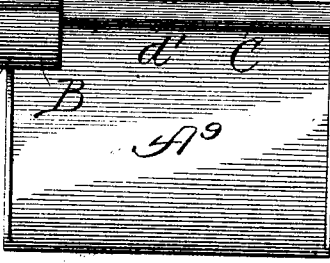
Witnesses:
Chas. E. Gaylord
John Enders Jr.
Inventors:
Mortimer B. Mills &
Herbert S. Mills,
By
Dyrenforth, Dyrenforth & Lee,
Attys.

No. 777,970. PATENTED DEC. 20, 1904.
M. B. & H. S. MILLS.
MAIL BOX, &c.
APPLICATION FILED MAR. 3, 1903.
NO MODEL. 12 SHEETS—SHEET 8.

Witnesses:
Chas S. Gaylord.
John Enders Jr.

Inventors:
Mortimer B. Mills &
Herbert S. Mills,
By Dyrenforth, Dyrenforth and Lee,
Attys.

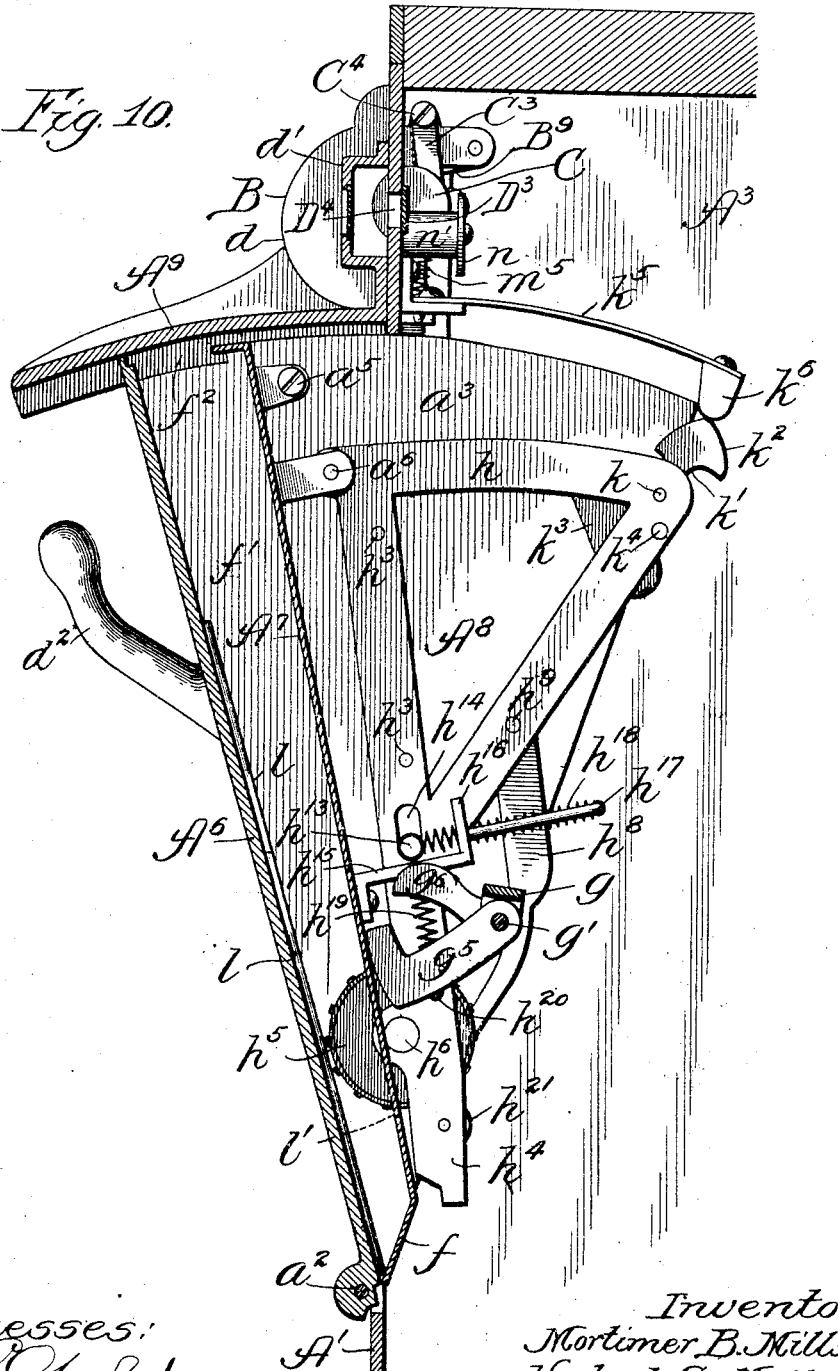

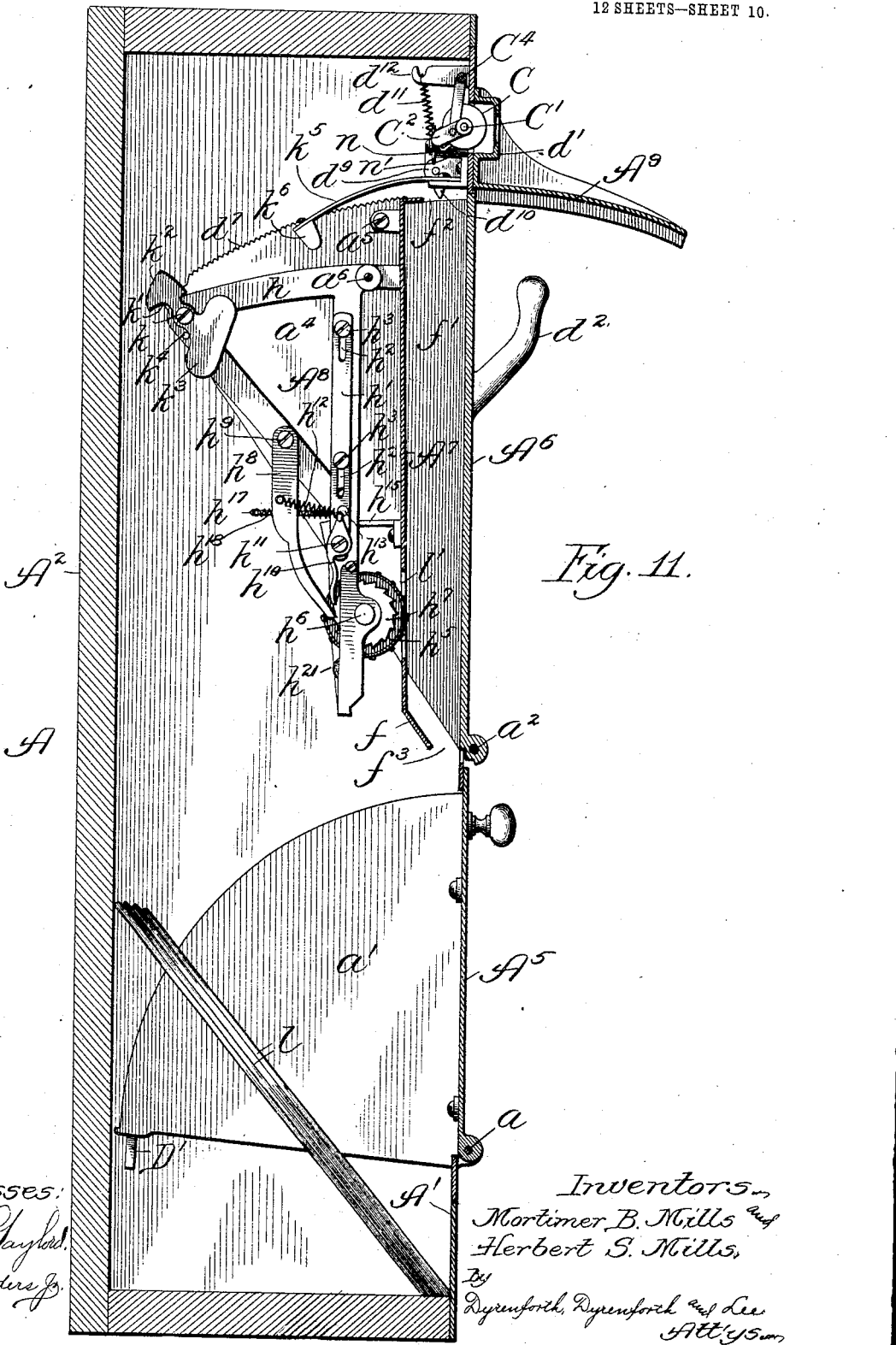

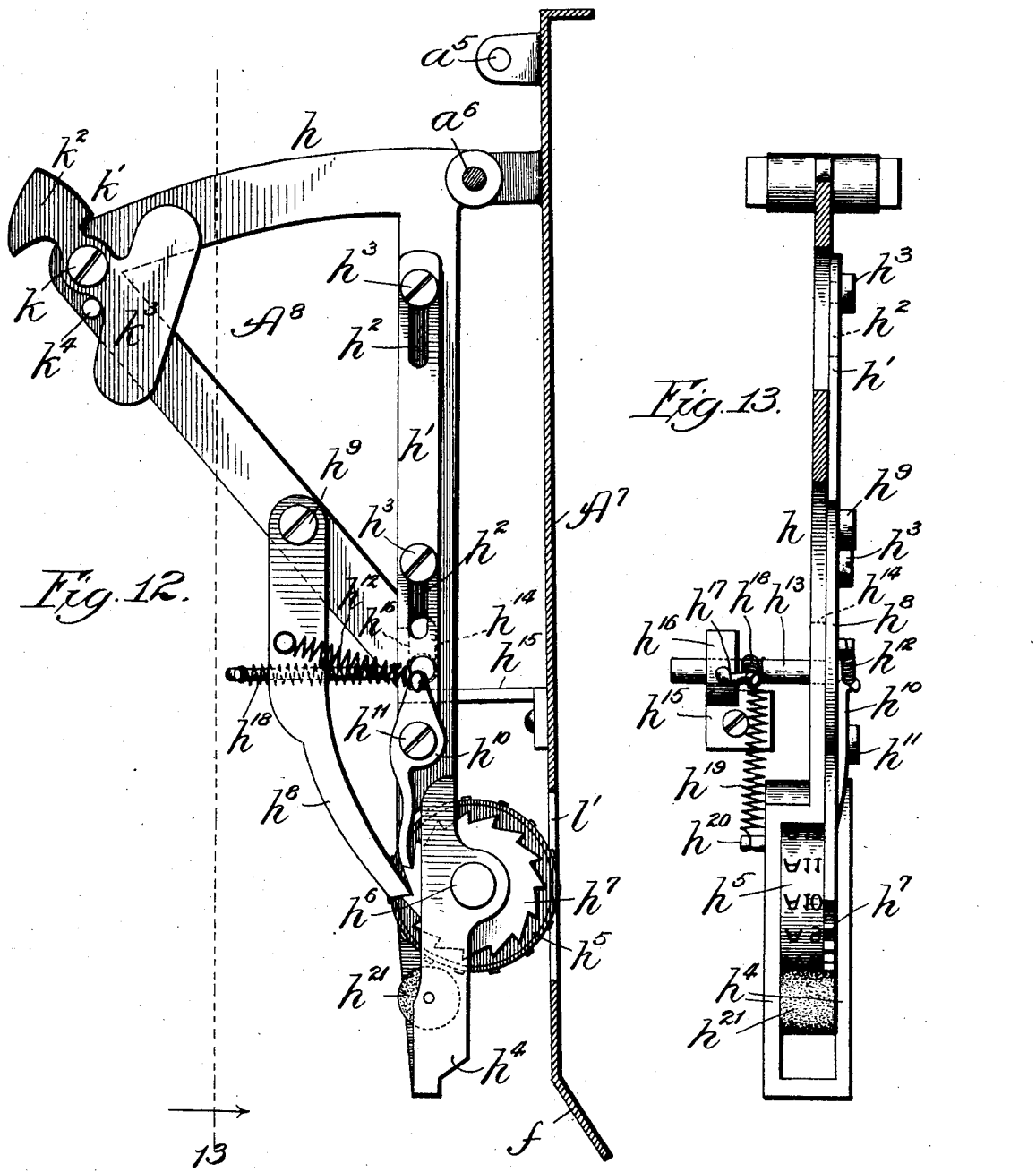

No. 777,970. PATENTED DEC. 20, 1904.
M. B. & H. S. MILLS.
MAIL BOX, &c.
APPLICATION FILED MAR. 3, 1903.
NO MODEL. 12 SHEETS—SHEET 12.
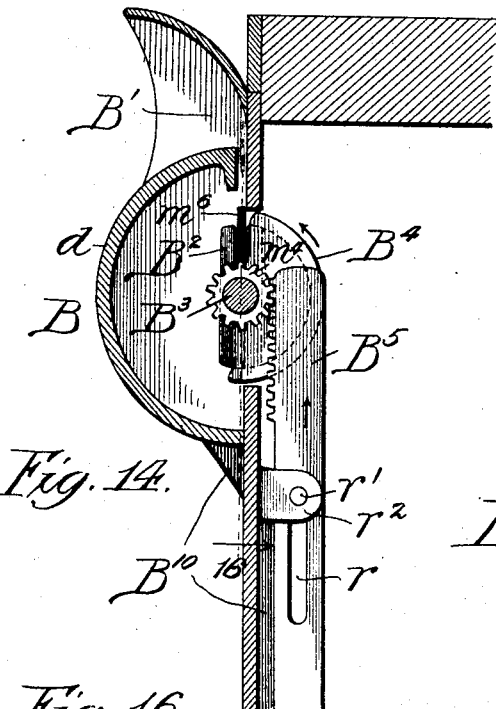
Fig. 14.
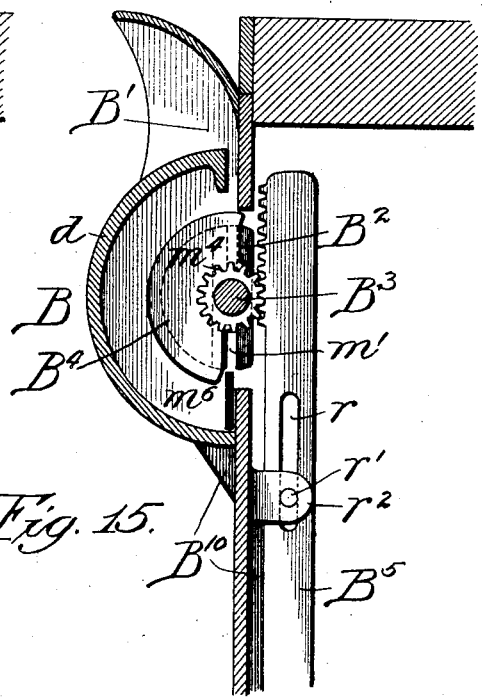
Fig. 15.
Fig. 16.
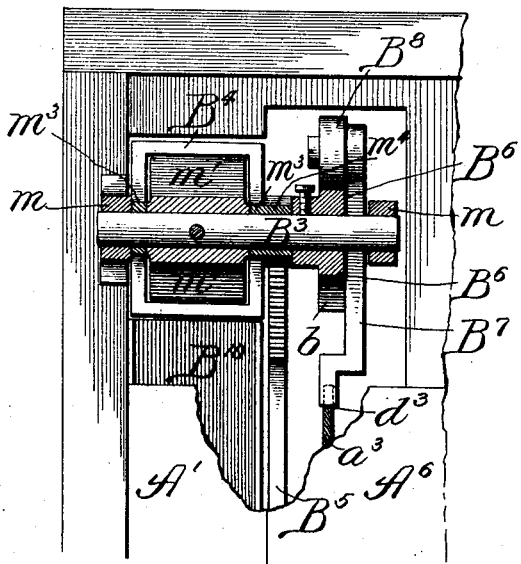
Fig. 17.
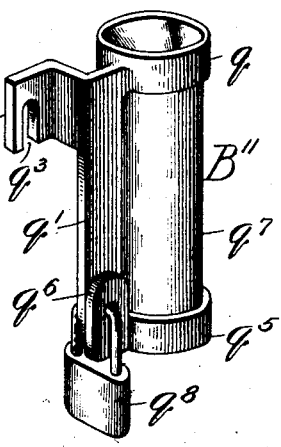
Witnesses:
C. L. Gaylord
John Enders Jr.
Inventors:
Mortimer B. Mills
Herbert S. Mills,
By Dyrenforth, Dyrenforth and Lee,
Att'ys No. 777,970.        Patented December 20, 1904.

UNITED STATES PATENT OFFICE.

MORTIMER B. MILLS AND HERBERT S. MILLS, OF CHICAGO, ILLINOIS, ASSIGNORS TO MILLS SPECIAL DELIVERY MAIL BOX COMPANY, OF CHICAGO, ILLINOIS, A CORPORATION OF WEST VIRGINIA.

MAIL-BOX, &c.

SPECIFICATION forming part of Letters Patent No. 777,970, dated December 20, 1904.

Application filed March 3, 1903. Serial No. 145,895.

*To all whom it may concern:*

Be it known that we, MORTIMER B. MILLS and HERBERT S. MILLS, citizens of the United States, residing at Chicago, in the county of Cook and State of Illinois, have invented a new and useful Improvement in Mail-Boxes, &c., of which the following is a specification.

Our invention relates particularly to mail-boxes for use in connection with special-delivery mail, although it will be understood the invention may be put to other purposes.

Our primary object is to provide mail-boxes equipped with coin-controlled mechanism controlling the introduction of letters and packages thereinto and the marking of the same, these mail-boxes to be placed at points convenient of access by the public and collections to be made therefrom at frequent intervals, the mail thus collected to go as special-delivery mail.

The invention is illustrated in its preferred embodiment in the accompanying drawings, in which—

Figure 3:
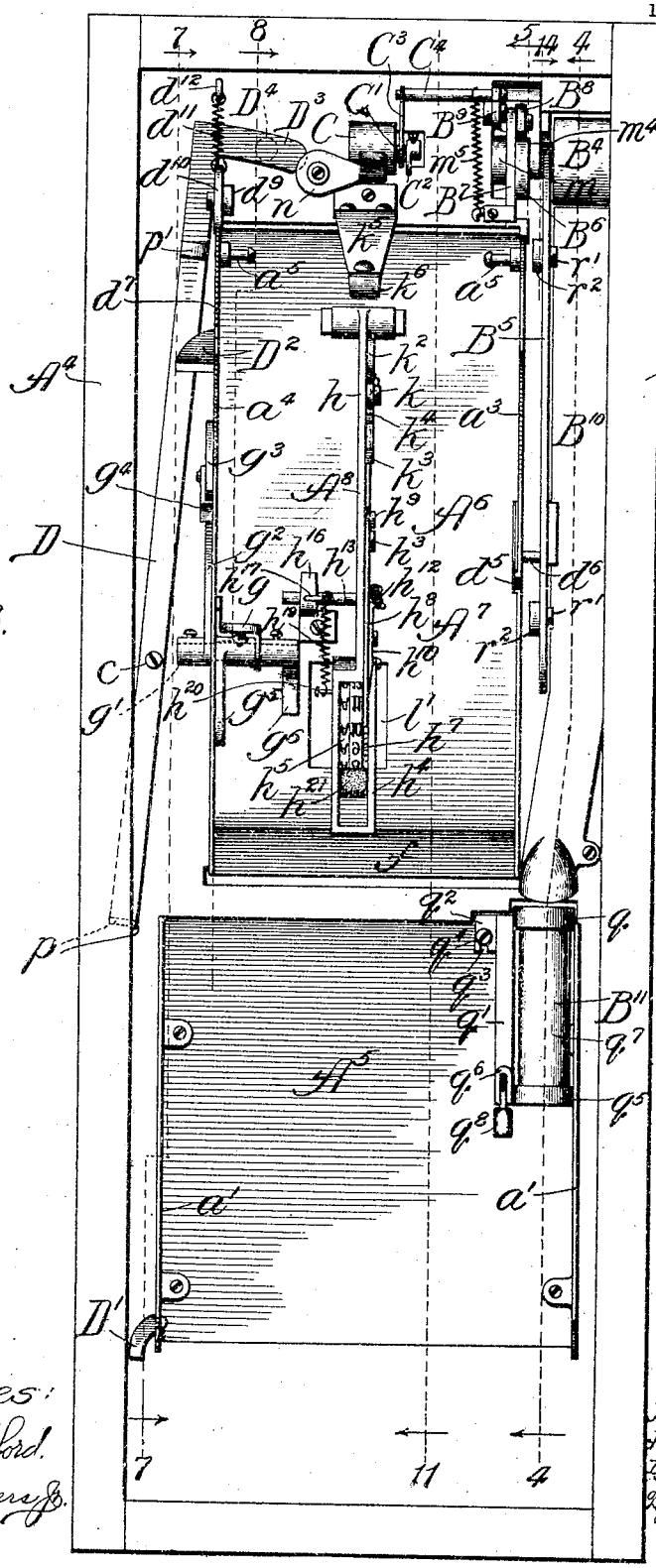
Figure 4:
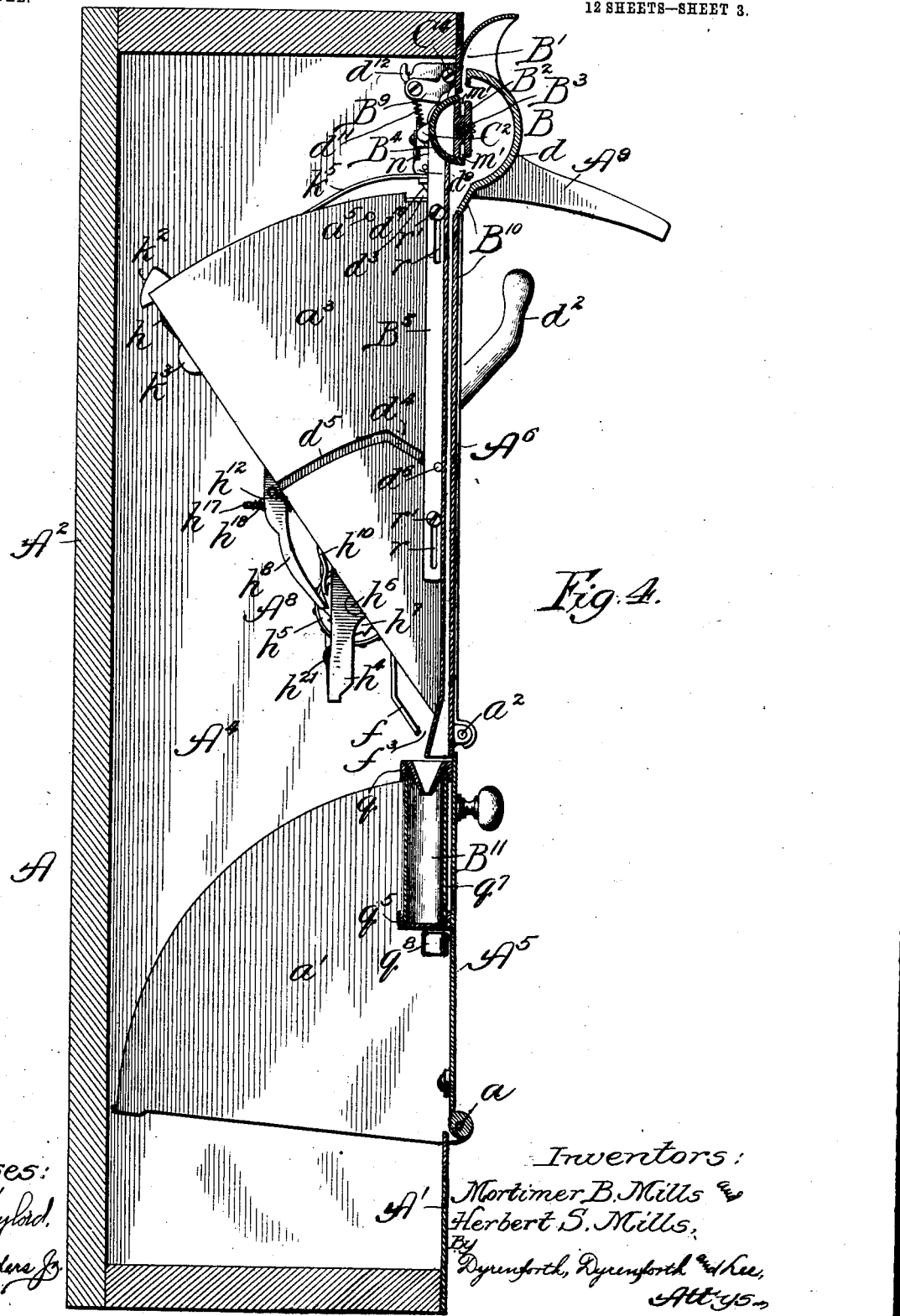
Figure 5:
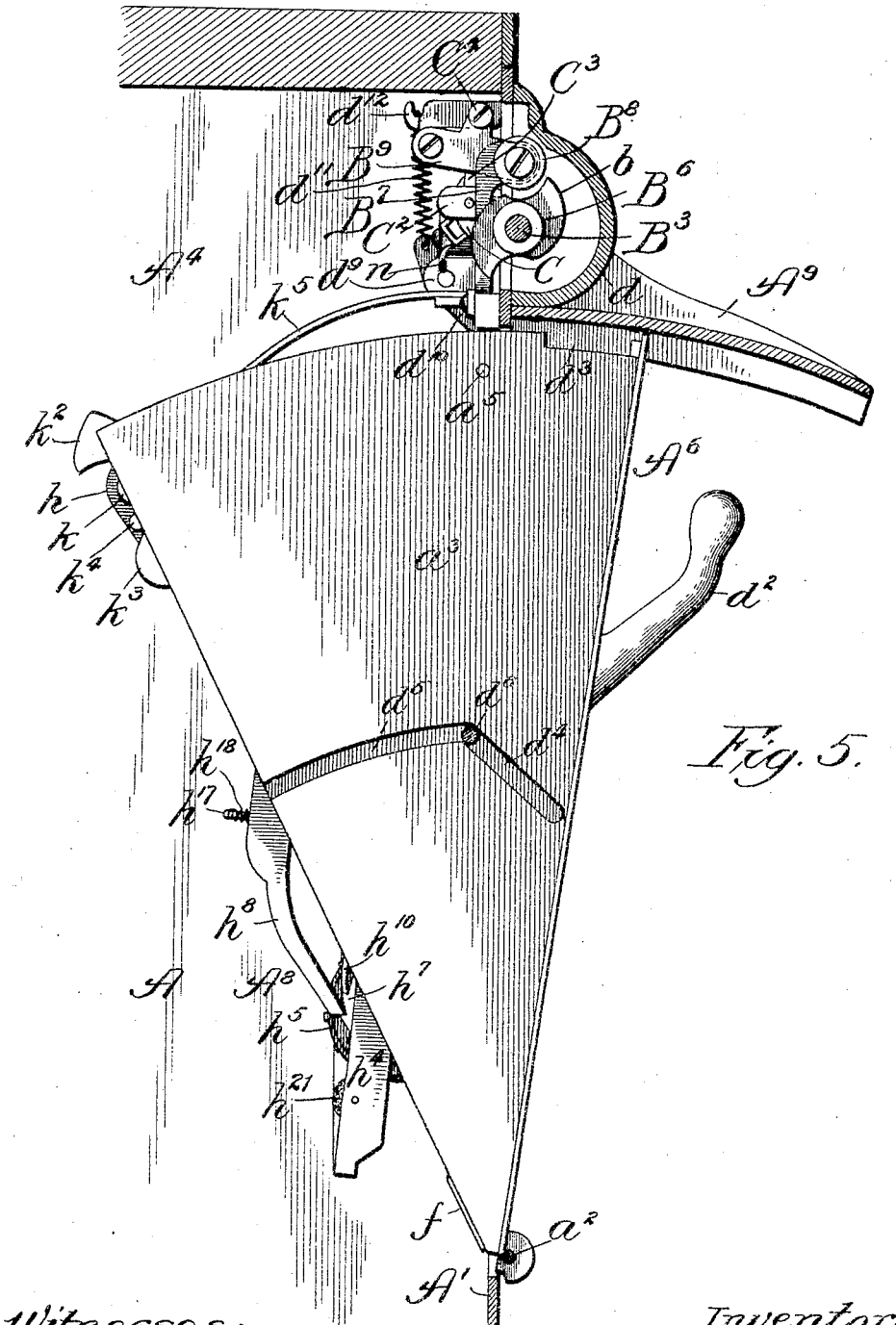
Figure 6:
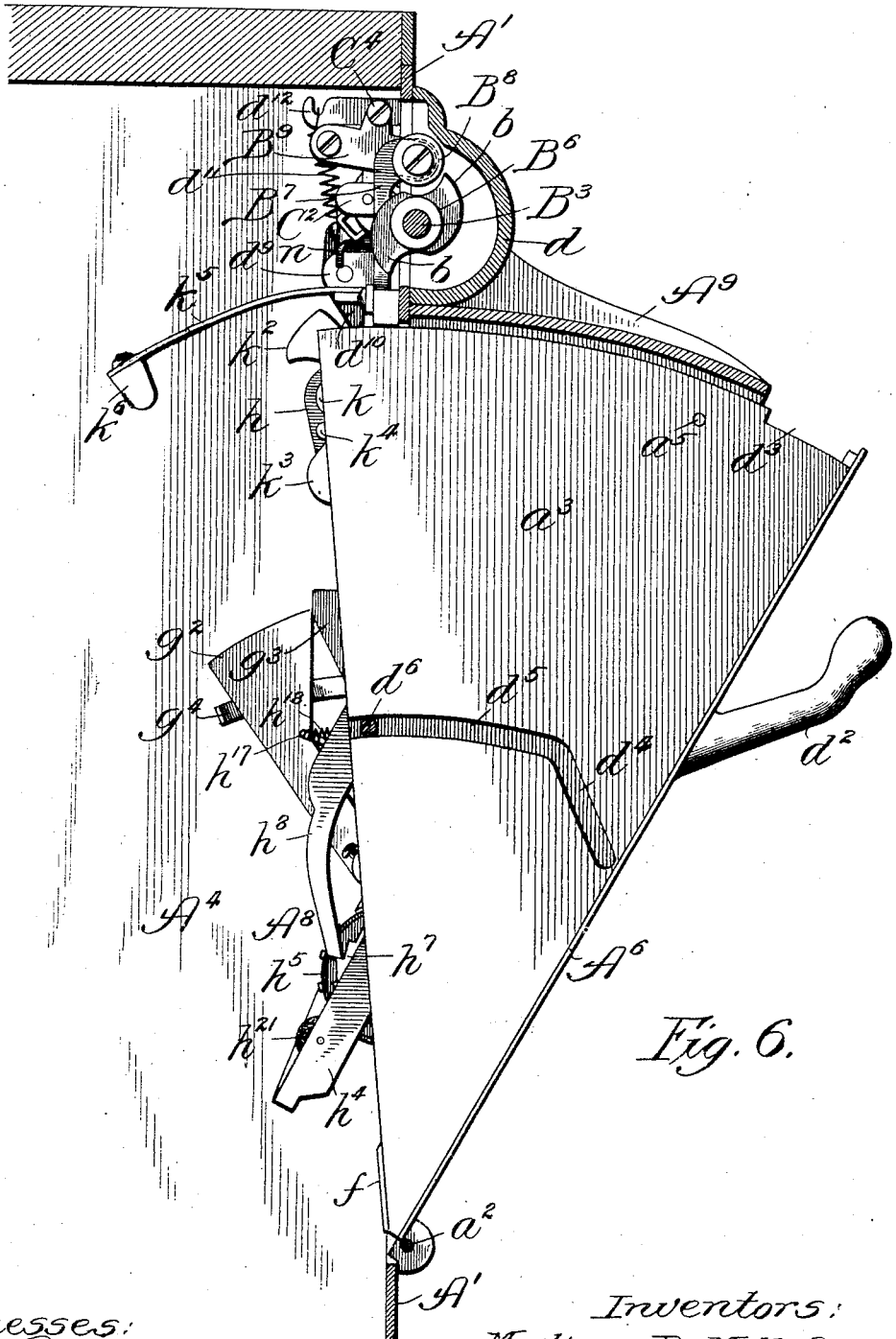
Figure 7:
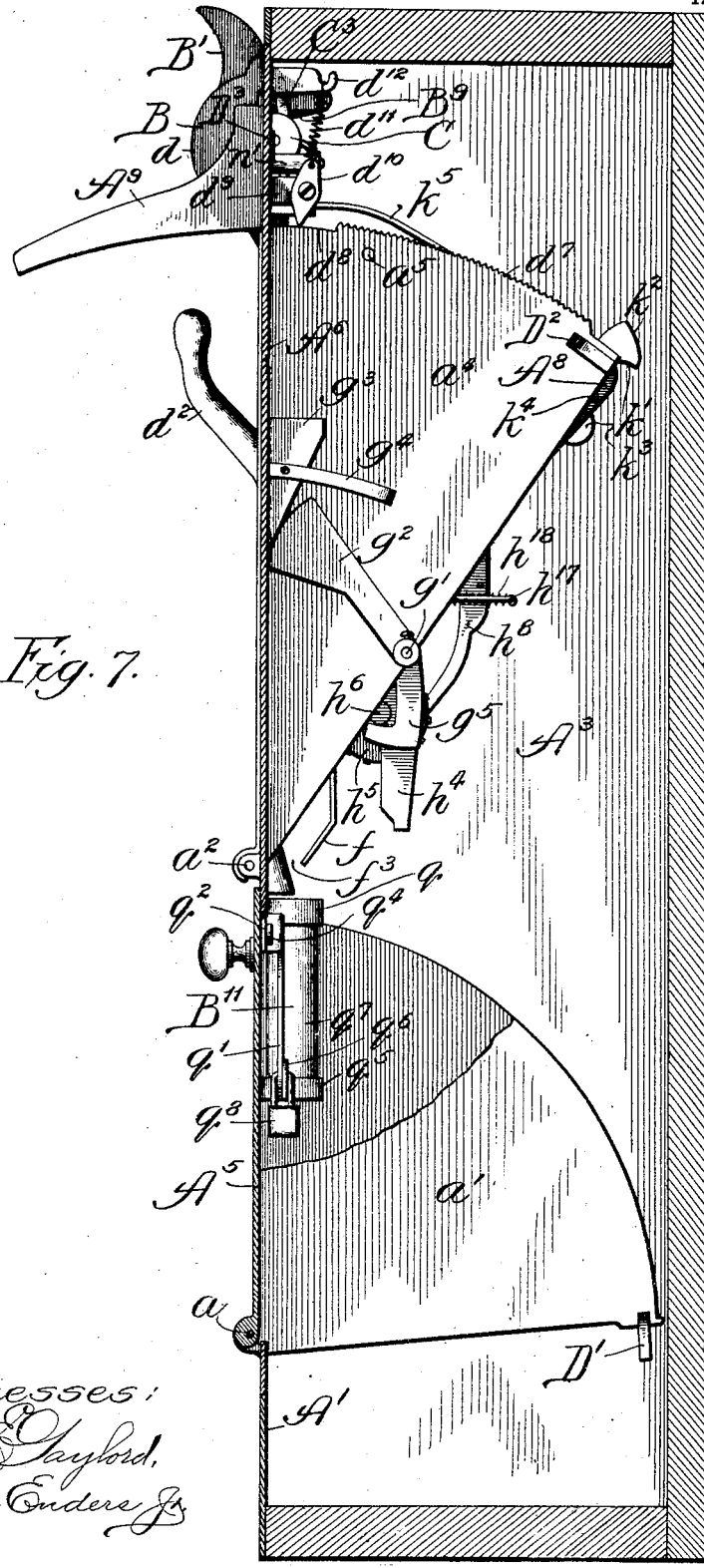
Figure 8:
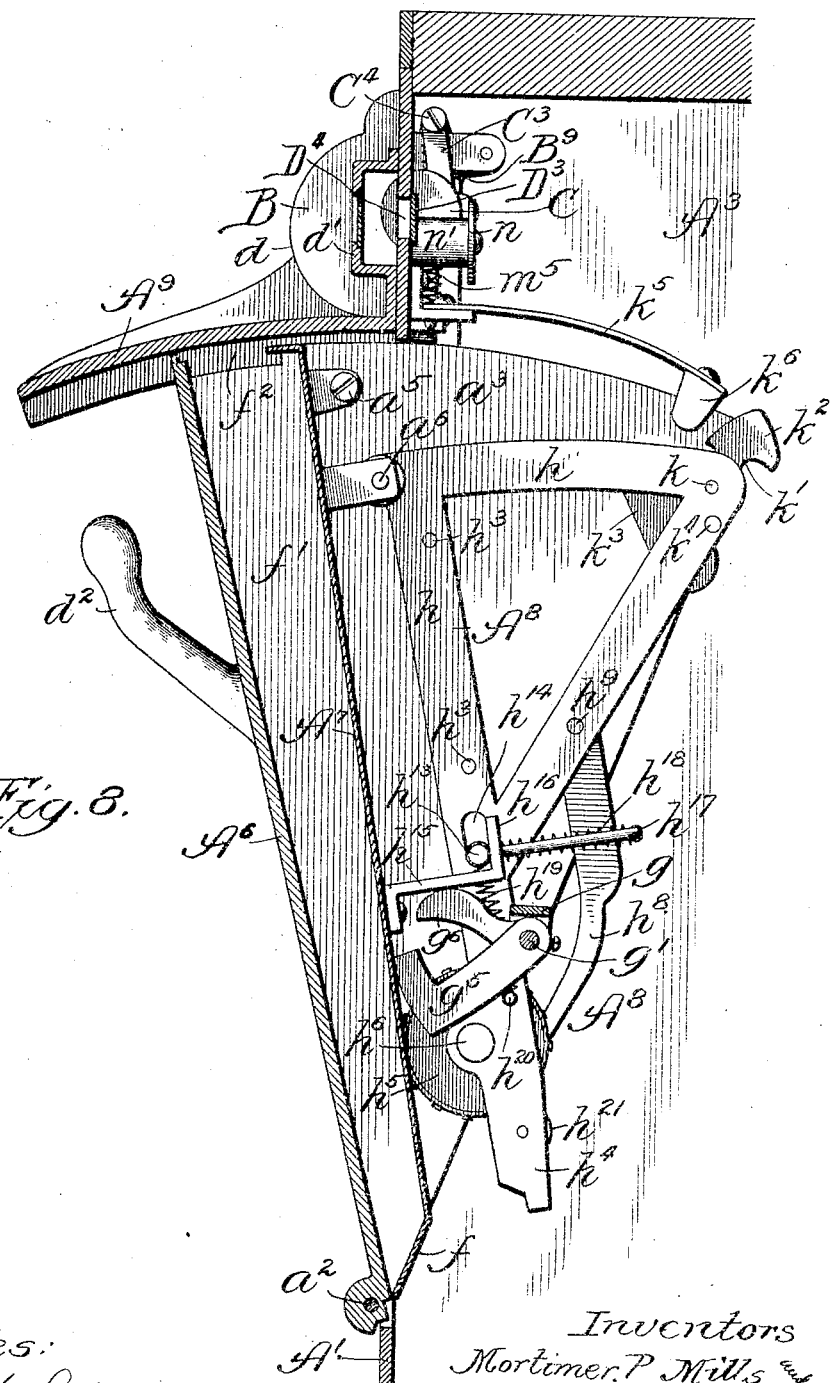
Figure 9:
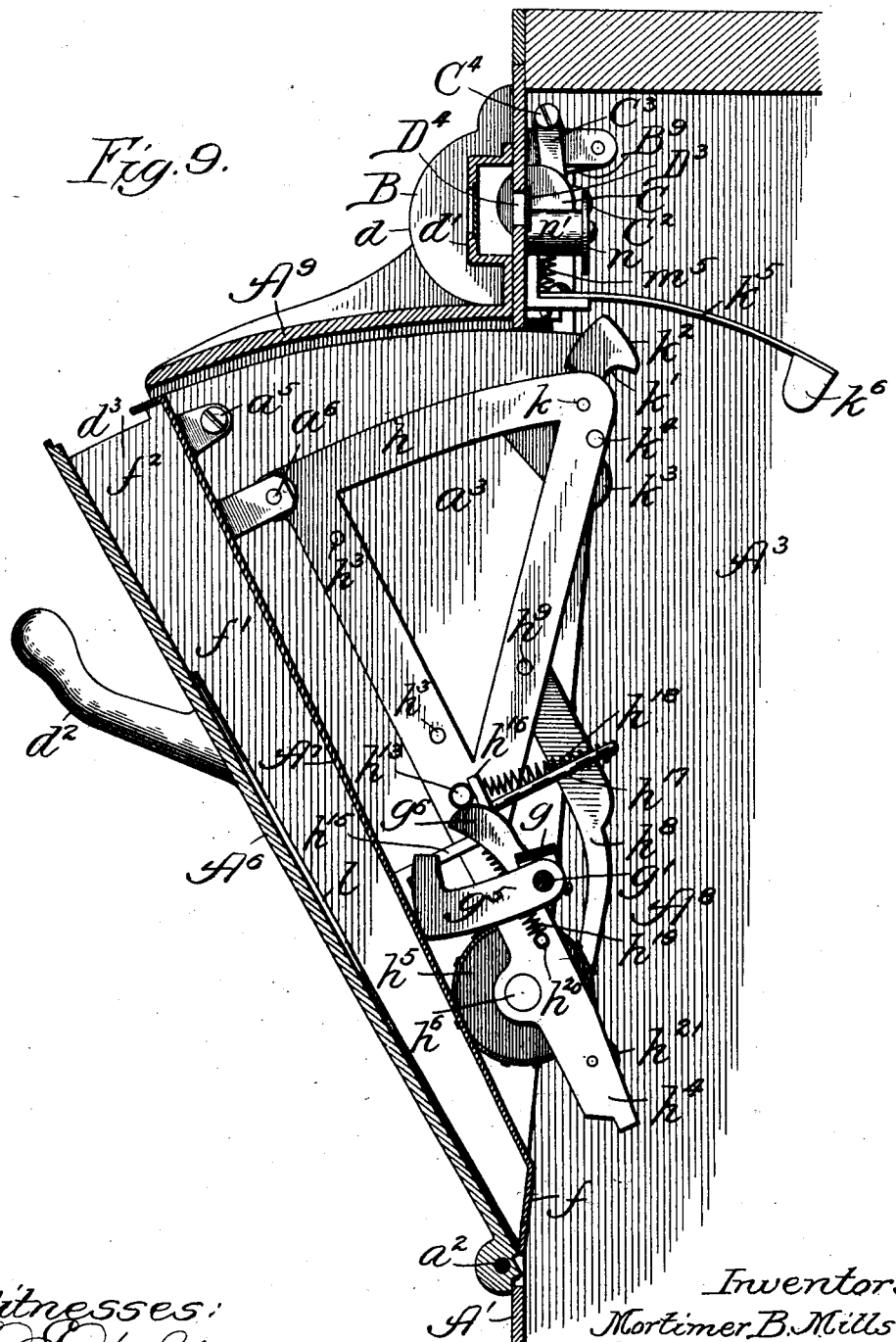

Figure 1 represents a broken front view of a mail-box equipped with our improvements; Fig. 2, a broken plan view of the same; Fig. 3, a rear view of the machine with the rear side removed; Fig. 4, a vertical section perpendicular to the front of the machine, the section being taken as indicated at line 4 of Fig. 3; Fig. 5, an enlarged broken section taken as indicated at line 5 of Fig. 3; Fig. 6, a view similar to Fig. 5, but showing a different position of the parts; Fig. 7, a vertical section taken as indicated at line 7 of Fig. 3; Fig. 8, an enlarged section taken as indicated at line 8 of Fig. 3; Fig. 9, a section similar to Fig. 8, but showing a different position of the parts; Fig. 10, another view similar to Fig. 8, but showing still another position of the parts; Fig. 11, a section taken as indicated at line 11 of Fig. 3; Fig. 12, an enlarged broken section similar to Fig. 11; Fig. 13, a section taken as indicated at line 13 of Fig. 12; Fig. 14, an enlarged broken section at the coin-chute, the section being taken as indicated at line 14 of Fig. 3; Fig. 15, a section similar to Fig. 14, but showing a different position of the parts; Fig. 16, a broken section taken as indicated at line 16 of Fig. 14, and Fig. 17 a perspective view of a coin-receptacle employed.

The preferred construction is as follows: A represents a casing or mail-box having a front side $A'$, a rear side $A^2$, and lateral sides $A^3 A^4$; $A^5$, a door connected by a pivot $a$ with the lower portion of the front of the casing and equipped on its inner surface at its vertical edges with sector-shaped flanges $a'$, said door serving as means whereat the mail may be removed; $A^6$, a combination letter-chute and closure for the mail-box, connected at its lower portion by a pivot $a^2$ with the front of the casing and equipped on its inner surface at its vertical edges with sector-shaped flanges $a^3 a^4$; $A^7$, a plate or member forming a portion of the letter-chute and connected by pivots $a^5$ with the flanges $a^3 a^4$; $A^8$, a printing or numbering device connected by pivots $a^6$ with the rear surface of the member $A^7$; $A^9$, a hood with which the casing-front is equipped and beneath which the letter-chute may be swung; B, coin-controlled mechanism controlling the introduction and stamping of letters and including an introductory slot or coin-passage $B'$, a rotatable coin-actuated member $B^2$, firmly connected with a shaft $B^3$, a combination pinion and coin-actuating member $B^4$, journaled on the shaft $B^3$, vertically-reciprocable rack $B^5$, having pin-and-slot connection with the flange $a^3$ of the letter-chute $A^6$, by which it is actuated, a cam-wheel $B^6$, fixed to the shaft $B^3$ and provided with two wings or arms $b$, a vertically-reciprocable letter-chute-locking bolt $B^7$, equipped with a roller $B^8$, a pivoted arm $B^9$, with which the plunger or bolt $B^7$ has pivotal connection, and a coin-chute $B^{10}$; $B^{11}$, a coin-receptacle removably connected with the door $A^5$; C, a cyclometer or counting device of usual construction connected with the upper portion of the casing and actuated from the pivoted member $B^9$; $C'$, the shaft of the cyclometer equipped with an actuating-arm $C^2$, connected by a link $C^3$ and a stud $C^4$ with the member $B^9$, and D a lever connected by a pivot $c$ with the front of the casing at the inner side thereof and actuated by cams $D' D^2$, carried, respectively, by the doors $A^5$ $A^6$, said lever having at its upper end a lateral projection $D^3$, serving as an indicator, which may be viewed through an opening $D^4$ to indicate whether or not a letter has been introduced into the box.

The casing may be constructed of any suitable material. We have shown the front of the casing constructed of sheet metal; but in practice it probably will be of cast metal. The casing-front is cut away to receive the cyclometer and certain portions of the coin-controlled mechanism, and the perforations thereby produced are covered by enlargements $d$ $d'$. The pivoted letter-chute $A^6$ is provided at its outer surface with a handle $d^2$ for convenience in opening. The flange $a^3$ of the letter-chute is provided at the front portion of its curved upper edge with a recess $d^3$, receiving the lower end of the locking-bolt $B^7$. The central portion of the flange $a^3$ is provided with a cam-groove having an upwardly and rearwardly extending portion $d^4$, beginning near the front vertical edge of the flange, and a circular portion $d^5$, struck on a radius from the center $a^2$, upon which the letter-chute swings. In this cam-groove works a pin $d^6$, which projects laterally from the lower portion of the rack-equipped member $B^5$. The flange $a^4$ of the letter-chute $A^6$ is equipped at its curved upper edge with ratchet-teeth $d^7$, which end some distance from the front of the casing, the flange being recessed to provide a smooth depressed surface $d^8$ at its front upper portion, Fig. 7. Pivoted on a lug $d^9$, projecting rearwardly from the inner surface of the upper portion of the casing, is a pawl $d^{10}$, which coacts with the ratchet-teeth $d^7$. A spring $d^{11}$ connects the upper end of the pawl with a lug $d^{12}$ on the inner surface of the casing-front.

During the operation of introducing a letter into the box after the insertion of the proper coin, usually a dime, the member $A^7$ of the letter-chute is preparatorily pressed forwardly to close the lower portion of the letter-chute before the upper end of the chute passes from beneath the hood $A^9$, and during the rearward movement of the letter-chute after the introduction of a letter thereinto the printing-wheel is preparatorily rotated, and the printing device is thereupon swung forwardly to cause an impression upon the letter. Thereafter the member $A^7$ and the printing device are released and the letters permitted to drop into the box. As shown, the member $A^7$ is pivotally supported at its upper end, and its vertical edges move practically in contact with the inner or adjacent surface of the flanges $a^3$ $a^4$. The lower end of the member is curved forward, as shown at $f$, and this provides a bottom for the letter-chute when the member $A^7$ is pressed forward. As thus described, a passage $f'$ is provided for receiving letters or packages, and this passage is open at its upper end, as shown at $f^2$, except when closed by the hood $A^9$. Also, as shown in Fig. 11, when the member $A^7$ is free to hang vertically a passage $f^3$ is afforded at the lower end of the letter-chute for the escape of the letters into the box. The flange $a^4$ of the letter-chute is provided at its lower portion with a bracket $g$, in which and the flange itself is journaled a rock-shaft $g'$. The shaft $g'$ is equipped at its outer end with an actuating-arm $g^2$, having a cam-shaped extremity engaging a fixed cam $g^3$ on the inner surface of the casing-front. A member $g^4$, connected with the cam $g^3$, serves as a guide and stop for the arm $g^2$. Adjacent to the inner surface of the flange $a^4$ the shaft $g'$ is equipped with an arm $g^5$, having a sector-shaped extremity adapted to engage the rear surface of the member $A^7$. The inner end of the shaft $g'$ is equipped with an arm $g^6$, which serves in the rotation of the printing-wheel.

The printing mechanism $A^8$ comprises a triangular frame member $h$, pivotally supported at its upper front corner, as indicated, Figs. 12 and 13; a vertically-slidable member $h'$, having slots $h^2$, receiving studs $h^3$, with which the frame $h$ is equipped; a loop $h^4$ at the lower corner of the frame $h$; a printing-wheel $h^5$, having a shaft $h^6$ journaled in the members of said loop and equipped with a ratchet-wheel $h^7$; a retaining-pawl $h^8$, connected by a pivot $h^9$ with the rearwardly and upwardly inclined member of the frame $h$; an actuating-pawl $h^{10}$, connected by pivots $h^{11}$ with the lower end of the slide $h'$; a spring $h^{12}$, connected with both said pawls and serving to hold them in engagement with said ratchet-wheel $h^7$; a stud $h^{13}$ on the lower portion of the slide $h'$, working in a slot $h^{14}$, Figs. 10 and 13, with which the vertical member of the frame $h$ is provided; a bracket $h^{15}$, Fig. 8, projecting rearwardly from the member $a^7$ and provided with an upturned portion $h^{16}$, serving as a stop, engaging the stud $h^{13}$ and limiting the rearward swing of the frame $h$; a rearwardly-extending member or standard $h^{17}$, having a hooked rear end connected by the spring $h^{18}$ with the stud $h^{13}$; a spring $h^{19}$, connected with the stud $h^{13}$ and a stud $h^{20}$, projecting laterally from the loop $h^4$ of the frame $h$, and an inking-roller $h^{21}$, journaled in the loop $h^4$ and contacting with the printing-wheel.

At the rear upper corner of the frame $h$ is secured, by means of a pivot $k$, a member $k'$, having a cam-shaped upper end $k^2$ and a weighted lower end $k^3$. Projecting laterally from the frame $h$ is a stud $k^4$, against which one edge of the member $k'$ bears at a short distance below its pivot. Projecting rearwardly from the casing-front above the path of the member $k'$ is a spring $k^5$, bearing at its extremity a depending lug $k^6$, located in the path of the upper end of the member $k'$. In the forward movement of the letter-chute the member $k'$ swings idly and in the rearward movement is operatively engaged by the member $h^6$, thereby depressing the frame $h$ and moving the printing-wheel into contact with the letter indicated by $l$, Fig. 10. The member $A^7$ is provided with a perforation $l'$ for permitting the printing-wheel to approach the letter.

Referring to Figs. 4 and 14 to 16, inclusive, the shaft $B^3$ is suitably journaled in bearings $m$, connected with the casing-front, and the coin-actuated and coin-carrying member $B^2$ is firmly fixed to the shaft. As shown, the member $B^2$ has two diametrically opposite wings provided with coin-recesses $m'$. The member $B^4$ comprises a half-cylinder with ends equipped with bearings $m^3$, journaled on the shaft $B^3$, one of which bearings has formed integrally therewith a pinion $m^4$, meshing with the rack $B^5$. The member $B^6$, Fig. 5, is firmly fixed to the shaft $B^3$, and the wings $b$ thereof have suitably-rounded edges for working readily beneath the roller $B^8$ and raising the locking-bolt $B^7$. A spring $m^5$, Fig. 3, connected with the stud $C^4$ and a stationary part, serves normally to hold the locking-bolt depressed. When a coin, as $m^6$, is dropped in at the chute $B'$, it serves to lock the member $B^2$ to the member $B^4$, so that when the member $B^4$ is rotated through the medium of the rack $B^5$ the member $B^2$ is caused to rotate. Each wing of the member $B^6$ is provided with a cavity for receiving the roller $B^8$, and the action is such that after the roller has passed the point of the wing the locking-bolt descends suddenly under the action of its spring and throws the shaft somewhat beyond a half-rotation, carrying the coin away from the coin-engaging edge of the member $B^4$, thereby permitting the coin to drop from the member $B^2$, as indicated in Fig. 15. In this position the upper portion of the member $B^4$ blocks the entrance to the coin-chute until the member $B^4$ returns to its original position which it does when the rack $B^5$ is depressed by swinging the letter-chute to the closed position. As appears in Figs. 1 and 9, the portion $d'$ of the casing-front is provided with a transparently-covered opening, through which the numbers of the cyclometer may be viewed. The cyclometer is conveniently supported on a bracket $n$, attached to a lug $n'$ on the inner surface of the casing-front.

As indicated in Fig. 3, the lever D is provided at its lower end with a rearwardly-projecting cam $p$, which in one position of the lever is in the path of a cam $D'$ at the lower inner corner of the flange $a'$ of the door $A^5$, and said lever is provided at its upper portion with a rearwardly-projecting cam $p'$, which in the other position of the lever is in the path of the cam $D^2$ at the rear upper corner of the flange $a^4$ of the member $A^6$. When the door $A^5$ is opened, therefore, the lever is moved to close the opening $D^4$, and when the letter-chute is swung open in depositing the next letter the lever is moved to uncover said perforation. The extremity $D^3$ of the lever may be provided with a conspicuous color, the exhibition of which will indicate that no letter has been dropped into the box since the last collection. The coin-receptacle $B^{11}$, Figs. 3, 4, and 17, comprises a top $q$, dished and slotted to permit the entrance of the coin; a depending stem $q'$, connected therewith and provided at its lower end with perforations; a bracket $q^2$, having a slot $q^3$ engaging a stud $q^4$, projecting inwardly from the upper portion of the door $A^5$; a bottom $q^5$, provided with a perforate lug $q^6$; a glass tube $q^7$, confined between the top and bottom of the receptacle, and a padlock $q^8$, connecting the lug $q^6$ with the lower end of the stem $q'$. This construction permits the receptacle to be removed from the door $A^5$ and replaced by a similar receptacle.

The rack $B^5$ is provided with slots $r$, which receive studs $r'$, carried by rearwardly-projecting lugs $r^2$ on the inner surface of the casing-front. Thus the rack is capable of moving freely in a vertical direction.

From the foregoing detailed description the manner of use will be readily understood. The improved mail-boxes are to be placed in convenient localities, and a person desiring to send a letter by special delivery takes the same to the nearby mail-box, deposits a dime, opens the letter-chute by drawing the handle $d^2$ forwardly, and then closes the letter-chute by pressing said handle rearwardly. The coin forms a connection between the member $B^4$ and the member $B^2$, so that when the letter-chute is swung forwardly, thereby elevating the rack $B^5$ through the action of the portion $d^4$ of the cam-slot on the pin $d^6$, both the member $B^4$ and the member $B^2$ are rotated through the medium of the rack. This lifts the locking-bolt $B^7$ during the initial movement of the letter-chute, thereby permitting the letter-chute to be moved forward the full distance. In this movement the pawl $d^{10}$ moves freely over the ratchet-teeth $d^7$, but serves to prevent a return movement of the letter-chute until its forward traverse is completed. During the final portion of the forward movement of the letter-chute the pin $d^6$ works in the portion $d^5$ of the cam-slot without causing further movement of the rack $B^5$. During this portion of the movement also the arm $g^2$ of the shaft $g'$ engages the cam $g^3$, rocks the shaft $g'$, and thereby swings the arm $g^5$ into engagement with the member $A^7$ of the letter-chute, thereby closing the letter-chute at its lower end. During the last portion of the forward traverse the arm $g^5$ simply bears against the member $A^7$ and holds it in the closed position. During this final portion of the traverse also the arm $g^6$ engages the stud $h^{13}$ and raises the slide $h'$, connected with the frame of the printing mechanism, thereby bringing the pawl $h^{10}$ into engagement with a fresh tooth of the ratchet-wheel H⁷. After the introduction of a letter into the letter-chute the chute is swung rearwardly, the shaft g' is permitted to turn back to its former position, and the slide h' resumes its former position, thereby rotating the printing-wheel. During almost the last portion of the rearward movement the member k, attached to the frame of the printing device, passes operatively beneath the member k⁶, whereby the frame of the printing mechanism is depressed, throwing the printing-wheel into contact with the letter. Finally the arm g⁵ is withdrawn from contact with the member A⁷ and the latter swings to the vertical position shown in Fig. 11, allowing the letter to drop into the box.

With desirable frequency the collector goes over his route, opens the mail-boxes, takes out the letters, preferably preserving them in the order in which they are arranged, removes the coin-receptacle and substitutes another one, notes the number appearing at the cyclometer in a suitable record-book, and returns to the post-office. Thereupon the coin-receptacle is unlocked, the coins and letters are examined in proper order to see that no bogus coins have been employed, and the reading of the cyclometer is noted to observe whether it corresponds with the letters received at the post-office. If the collector on his rounds finds a box where the indicator shows that the letter-chute has not been opened, he knows at once that it is unnecessary to open the mail-box. Should the sender of a letter introduce two letters at once, only one of the letters will receive a number, and consequently only one would be passed on to its destination by special delivery. The coin-receptacle is of a cross-section corresponding with the coins received by it, and consequently it is impossible for the coins to get out of the order in which they are introduced. This enables each coin to be identified with the letter which it served to introduce, so that if a bogus coin were to be employed the fraud would be detected. This renders unnecessary the use of any separate fraud preventive in connection with the improved machine.

It will be understood, of course, that the printing mechanism may be made as complex as may be necessary to give any desired impression upon the letters. As the printing-wheel is shown in the drawings it comprises a single wheel provided with numbers from "1" to "12" and adjacent to each number with a letter indicating a station or city, as desired.

So far as the coin-receptacle is concerned any suitable expedient may be employed for preventing disarrangement of the coins, the desired end being to keep the coins in order corresponding with the order of the letters, which by reason of the nature of their introduction and the limited capacity of the letter-receptacle are preserved in proper order. In many other respects the mechanism may be changed as circumstances may require without departure from our invention. Hence no undue limitation should be understood from the foregoing detailed description, the same having been given for clearness of understanding only.

What we regard as new, and desire to secure by Letters Patent, is—

1. In means of the character described, the combination of a suitable receptacle, a swinging letter-chute provided with ratchet-teeth and with a locking-shoulder, a pawl engaging the ratchet-teeth, a locking-bolt for engaging said locking-shoulder and permitting initial movement of the letter-chute, and coin-controlled releasing means including a vertically-movable member having cam connection with and actuated by said letter-chute.

2. In means of the character described, the combination with a suitable casing, of a movable letter-chute, locking means therefor permitting initial movement of the letter-chute, and coin-controlled releasing means including a vertically-movable rack connected with and actuated by said letter-chute during initial movement thereof, a coin-actuating member actuated by said rack, and a coin-actuated member actuating the locking-bolt of said locking means for the purpose set forth.

3. In means of the character described, the combination with a suitable receptacle, of a closure device, a vertically-movable rack actuated by said closure device during initial movement thereof, a rotatable coin-actuating member equipped with a pinion meshing with said rack, a rotatable coin-actuated member equipped with a plurality of coin-recesses, and a locking-bolt actuated by said last-named member and permitting initial movement of the closure device.

4. In means of the character described, the combination with a suitable receptacle, of a closure device, a locking device therefor permitting initial movement of the closure device, a vertically-movable rack actuated by said closure device during initial movement thereof, a rotatable coin-actuating member equipped with a pinion meshing with said rack, a rotatable coin-actuated member equipped with a plurality of coin-recesses, a locking-bolt, a locking-bolt-actuating member actuated by said coin-actuated member and equipped with a plurality of cam-arms, and means coacting with said cam-arms and controlling the movements of said cam-actuated member, for the purpose set forth.

MORTIMER B. MILLS.
HERBERT S. MILLS.

In presence of—
WALTER N. WINBERG,
W. B. DAVIES.